United States Patent [19]

Gerstner et al.

[11] Patent Number: 5,743,619

[45] Date of Patent: Apr. 28, 1998

[54] FASTENING ARRANGEMENT FOR A VEHICLE LAMP

[75] Inventors: Harald Gerstner; Reiner Jocher, both of Aidlingen; Horst Dahm, Neuhengstett; Olaf Ebbesmeyer, Sindelfingen, all of Germany

[73] Assignee: Mercedes-Benz AG, Germany

[21] Appl. No.: 563,242

[22] Filed: Nov. 28, 1995

[30] Foreign Application Priority Data

Nov. 28, 1994 [DE] Germany ................ 44 42 294.6

[51] Int. Cl.$^6$ ........................................ B60Q 1/02
[52] U.S. Cl. ................. 362/82; 362/61; 362/80; 362/365; 362/370; 362/432
[58] Field of Search ..................... 362/61, 80, 82, 362/83, 365, 368, 370, 382, 432

[56] References Cited

U.S. PATENT DOCUMENTS

| | | | |
|---|---|---|---|
| 3,625,796 | 12/1971 | Graves | 362/82 |
| 3,754,131 | 8/1973 | DiSalvo et al. | 362/82 |
| 4,532,578 | 7/1985 | Gaden et al. | 362/83 |
| 4,539,626 | 9/1985 | Hawlitzki et al. | 362/83 |
| 5,010,456 | 4/1991 | Reichman et al. | 362/82 |
| 5,267,128 | 11/1993 | Shamir et al. | 362/82 |

FOREIGN PATENT DOCUMENTS

| | | |
|---|---|---|
| 35 25 198 A1 | 1/1987 | Germany. |
| 41 33 002 C2 | 8/1993 | Germany. |

*Primary Examiner*—Alan Cariaso
*Attorney, Agent, or Firm*—Evenson, McKeown, Edwards & Lenahan, P.L.L.C.

[57] ABSTRACT

A fastening arrangement fits a vehicle lamp in a receptive trim element and has at least two holders protruding from the lamp in the peripheral region of a diffusing screen. The holders are spaced apart and, when the lamp is installed, are fixed to associated holders of the trim element. One of the protruding holders, as the lamp is inserted, is able to be put together with the associated holder of the trim element, and having the plug connection secured by a screw fastening. The lamp, as it is inserted into the trim element, is conveyed into its installation position by a longitudinal displacement motion essentially parallel to the principal extent of the diffusing screen to eliminate the need for the frame opening in the trim element to be overdimensioned relative to the lamp. Each holder protruding from the lamp in the peripheral region of the diffusing screen extends in the sliding direction and is put together with its associated holder on the trim element. The screw-connectable holders, once the lamp is displaced into its installation position, are disposed behind the lamp to be accessible by a screwing tool.

10 Claims, 1 Drawing Sheet

FASTENING ARRANGEMENT FOR A VEHICLE LAMP

BACKGROUND AND SUMMARY OF THE INVENTION

The present invention relates to a fastening arrangement for fitting a vehicle lamp in a receptive trim element, especially for insertion into a motor-vehicle bumper, and more particularly to a fastening arrangement having at least two holding devices protruding from the lamp in a peripheral region of a diffusing screen. The holding devices are spaced apart and, when the lamp is installed, are fixed to associated holding devices of the trim element. One of the protruding holding devices, as the lamp is inserted, is able to be put together with the associated holding device of the trim element. The plug connection is secured by a screw fastening, for which purpose a holding device protruding from the lamp can be screwed such that it rests upon a counter-surface of an associated holding device.

A known fastening arrangement is described in DE 35 25 198 A1, in which the fog lamp, in the installed state, is fixed solely on a frame of the trim element. The frame encloses the peripheral region of the diffusing screen. For fastening purposes, a ball pin protrudes from a peripheral side of the lamp and can be inserted in a fork opening in the frame. An articulated holder is fitted on the opposite peripheral side of the lamp, and, once mounted on the frame, is screwed to the latter. This screw-fastening point is accessible from the outside and is only later concealed by the subsequent fitting of the blinker lamp which can be fitted next to the fog lamp. Because the fog lamp has to be swivelled about a ball pin axle which runs in spring-back arrangement, there is a need in the trim element for a frame opening which is enlarged relative to the diffusing screen. This can be undesirable for stylistic reasons.

In addition, the screw-fastening point of the fog lamp is accessible from the outside, and must therefore be provided with a cover which additionally has to be present and fitted in the event of individual arrangement of the fog lamp.

Furthermore, DE 41 33 002 C2 describes a fastening device for a headlamp module of motor vehicles in which the headlamp module can be adjustably fitted and, where necessary, can be easily replaced. The fastening device comprises an angled-off bracket which can be screw-fastened to the body panel. The headlamp module is guided on this bracket in a sliding manner by at least one guide, e.g. a dovetail guide, and positionally secured in its end position by a locking element. A screw fastening of the headlamp module itself to the bodywork is not in this case provided. Because the known headlamp module can be slid in from the outside, an overdimensioning of the assigned frame opening in the trim element is also unavoidable.

An object of the present invention is to provide a fastening arrangement such that no overdimensioning of the frame opening in the trim element relative to the lamp is necessary and the suitability of the fastening arrangement to an individual arrangement of the lamp is considerably improved.

The foregoing object has been achieved according to the present invention by providing that the lamp, as it is inserted into the trim element, can be conveyed into its installation position by a longitudinal displacement essentially parallel to the principal extent of the diffusing screen. For this purpose, each holding device protruding from the lamp in the peripheral region of the diffusing screen extends in the sliding direction and can be put together with its associated holding device on the trim element. The screw-connectable holding devices, once the lamp is displaced into its installation position, are disposed behind the lamp such that they are accessible to a screwing tool.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
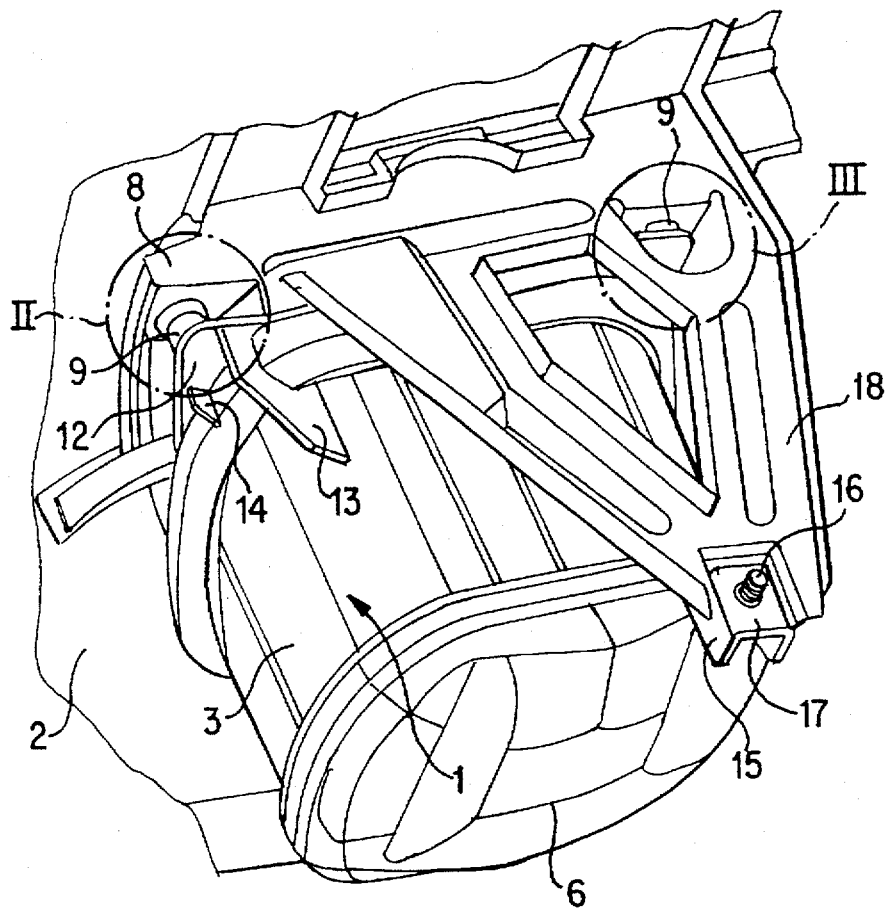
FIG. 1 is a perspective rear view of a fog lamp fastened in a bumper.

A motor-vehicle fog lamp 1 shown in FIG. 1, is integrated on the left side in a partially-shown front bumper 2. The fog lamp 1 has a housing 3 with a molded-in reflector 4 (FIG. 2), in which a conventional light source (not shown) is accommodated such that it is protected from water spray. The housing 3, which has an oval hollow section, is encapsulated on the front side by a diffusing screen 5 and on the rear side by a removable housing cover 6.

Figure 2:
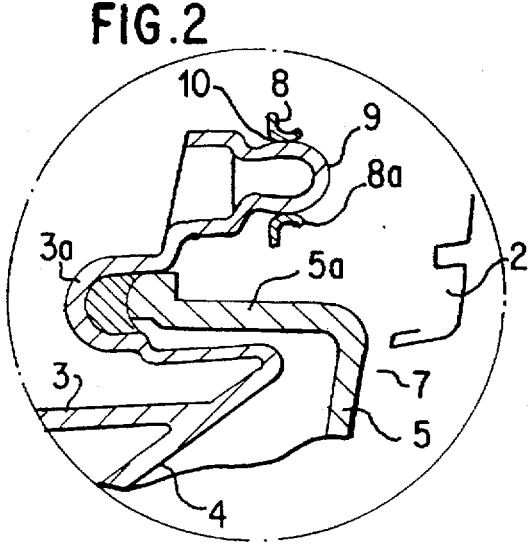
FIG. 2 is a cross-sectional view of a left socket point of the fog lamp of FIG. 1.
Figure 3:
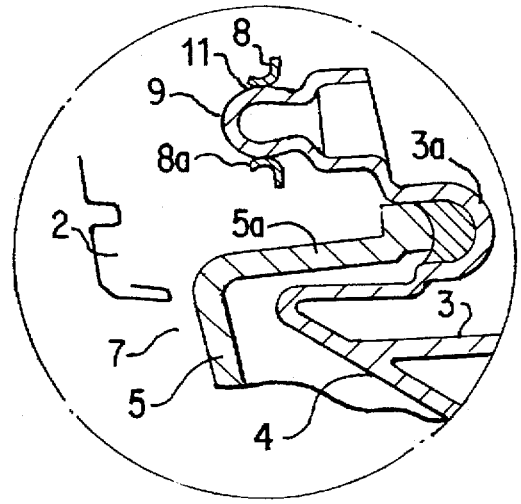
FIG. 3 is a cross-sectional view of a right socket point of the fog lamp of FIG. 1.

As can be seen in the sectional views in FIGS. 2 and 3, the diffusing screen 5 ends with a screen rim 5a which is bent towards the rear and which is fixed such that it engages with its rear narrow side in a fillet-like sealing seat 3a of the housing 3. The fog lamp 1 is fitted at a small distance behind an associated light aperture 7 in the bumper 2. The light aperture 7 is somewhat smaller than the light-radiating surface of the diffusing screen 5. The fog lamp 1 must thus be fitted from the rear side of the bumper 2. Especially when the bumper 2 is installed, this fitting from the rear is normally a problem because a lower end region of the bumper 2 extends apron-like towards the rear, thereby making it more difficult, in the proximity of the light aperture 7, to gain access to the rear side of the bumper 2.

In order, nevertheless, to enable the fog lamp 1 to be fitted or removed without difficulty, a three-point fastening of the fog lamp 1 is provided in accordance with the present invention and comprises two front socket points and a screw-fastening point disposed behind the fog lamp 1.

For the spring-back, concealed socket, a frame 8 of hollow-profiled cross section is disposed above the light aperture 7 and is configured in one piece, i.e. unitary, with the plastic bumper 2. In the backward-facing wall of the end regions of the frame 8, which end regions project on both sides relative to the light aperture 7, a holding sleeve 8a is respectively molded with a tubular shape and, in the hollow section of the frame 8, juts outwardly.

Holding pins 9 are inserted in the tubular cross-section of the two holding sleeves 8a in a precise-fitting manner. The holding pins 9 protrude coaxially from the housing 3 and have a cross-sectional shape roughly corresponding to a hollow cylinder. Advantageously, the holding pins 9 are slightly conically configured in their front end region, so that, as they are inserted into the assigned holding sleeve 8a, they are automatically centered.

The holding sleeves 8a, moreover, behind their front end region, are preferably slightly overdimensioned relative to the hollow section of the holding sleeve 8a and the holding sleeve 8a and/or holding pin 9 are slightly flexible in the radial direction. This configuration reliably produces during the insertion procedure an absolutely play-free and hence also rattle-free, plug connection, because the holding sleeve 8a is elastically expanded or the holding pin 9 elastically compressed.

Preferably, the hollow section, in one of the two holding sleeves 8a, is a round hole 10 and, in the other holding sleeve 8a, an elongated hole 11. A tolerance compensation is thereby easily achieved, so that the spacing between the holding pins 9 does not have to be maintained, for example, with absolute precision.

As seen in FIG. 1, the two holding pins 9 interacting with the holding sleeves 8a protrude from corner plates 12 which are injection-molded on both sides onto the periphery of the sealing seat 3a and hence onto the housing 3. These corner plates 12 are configured in one piece with their holding pin 9 and supplement the peripheral shape at the top of the oval housing 3 to form a rectangle to lie opposite the associated wall of the frame 8 and hence their holding sleeves 8a. The corner plates 12 are stiffened by cross-ribs 13, 14 which extend towards the rear and are connected in one piece to the housing 3.

In addition, a reinforcement profile 15 of U-shaped cross-section juts centrally between the corner plates 12 from the upper peripheral wall of the housing 3. The profile 15 extends horizontally rearwardly to behind the housing cover 6 and has an upwardly facing center limb penetrated by a bore through which the reinforcement profile 15 is screwed by a sheet-metal screw 16 to a plate nut 17 thereabove which is supported by a rear end of a holder 18. The holder 18 is configured as a triangular bearing frame which protrudes from the rear side of the frame 8 and covers the top side of the housing at a distance. This spacing produces a suspended arrangement of the fog lamp 1, with the screw location remaining accessible from below.

The fog lamp 1 can thus be very rapidly and inexpensively fitted. To achieve that objective, the fog lamp 1 is put in place at a distance behind the bumper 2, and the diffusing screen 5 is brought into line with the light aperture 7. Thereafter, the fog lamp 1 is longitudinally displaced in a forward horizontal plane so that the diffusing screen 5, by virtue of a displacement parallel to the light aperture of the bumper 2, makes its way into its installation position lying close behind the light aperture 7. Upon this installation movement, the holding pins 9 which have been jointly moved are plunged (or plugged) into their assigned holding sleeves 8a, thereby producing the play-free socket. After the plate screw 16 is then tightened, the fog lamp 1 is fastened in a desired manner to the bumper 2.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A fastening arrangement for fitting a vehicle lamp in a receptive trim element, comprising at least two spaced-apart holder devices protruding from the lamp in a peripheral region of a diffusing screen, associated holders of the trim element to which the at least two holder devices are fixed when the lamp is in a finally installed position, one of the at least two holder devices being configured such that, upon insertion, the lamp is operatively joined with the associated holder of the trim element to constitute a plug connection, and a screw fastener for securing the plug connection comprising holding means protruding from the lamp and arranged to be screwed to rest upon a counter-surface of an associated holding structure at a sufficient distance rearwardly of the at least two holder devices so as to be accessible by a screwing tool from below the fastening arrangement, wherein that the lamp is configured to be, upon being inserted into the trim element, conveyed by sliding into an installation position by a longitudinal displacement essentially parallel to the diffusing screen, each of the at least two holder devices extending in a direction of the sliding and being assembleable together with one of the associated holders, and the holding means, at the installed position of the lamp, are accessibly disposed behind the lamp.

2. A fastening arrangement for fitting a vehicle lamp in a receptive trim element, comprising at least two spaced-apart holder devices protruding from the lamp in a peripheral region of a diffusing screen, associated holders of the trim element to which the at least two holder devices are fixed when the lamp is in a finally installed position, one of the at least two holder devices being configured such that, upon insertion, the lamp is operatively joined with the associated holder of the trim element to constitute a plug connection, and a screw fastener for securing the plug connection comprising holding means protruding from the lamp and arranged to be screwed to rest upon a counter-surface of an associated holding structure, wherein that the lamp is configured to be, upon being inserted into the trim element, conveyed by sliding into an installation position by a longitudinal displacement essentially parallel to the diffusing screen, each of the at least two holder devices extending in a direction of the sliding and being assembleable together with one of the associated holders, and the holding means, at the installed position of the lamp, are accessibly disposed behind the lamp, wherein the lamp is positionable behind a light aperture of the trim element, the light aperture having a smaller area than an area of the diffusing screen, the at least two holding devices being configured to extend up to a frame of the trim element, the frame being contiguous with the light aperture and concealably disposing therebehind the associated holders.

3. The fastening arrangement according to claim 1, wherein the holder devices and associated holders, as well as the holding means comprise a three-point lamp fastening arrangement with two socket points and a screw-fastening point disposed approximately centrally therebetween.

4. The fastening arrangement according to claim 3, wherein the installed lamp is suspension-mounted, the at least two holder devices, respectively, protruding from the lamp in an upper corner region thereof, and the holding means jutting out from a upper peripheral side of the lamp.

5. The fastening arrangement according to claim 1, wherein the at least two holder devices comprises an approximately cylindrical holding pin which, after the lamp has been inserted, engages in a plug-in opening comprising the associated holders and is radially supported.

6. The fastening arrangement according to claim 5, wherein the plug-in opening of one of the associated holders is a round hole matched to the cross-section of the holding pin, and the plug-in opening of each other associated holding structure is an elongated hole.

7. The fastening arrangement according to claim 1, wherein the lamp comprises a housing, in which a reflector and light source are protectively accommodated, each of the at least two holder devices and holding means being arranged on the housing.

8. The fastening arrangement according to claim 7, wherein the at least two holders devices and the holding means are configured in one piece with the housing and are configured to provide stiffening structural points of the housing.

9. The fastening arrangement according to claim 2, wherein a holder frame extends above the lamp and juts out from the trim element frame in the region of the associated holders, the frame being disposed above the light aperture and has at a free end thereof a component of the holding means.

10. The fastening arrangement according to claim 9, wherein the holder frame is a triangular bearing frame.

* * * * *